J. W. McCAUGHEY.
MIXING AND PACKING APPARATUS FOR MOLASSES FEED.
APPLICATION FILED OCT. 28, 1916.

1,267,241.
Patented May 21, 1918.
3 SHEETS—SHEET 3.

Inventor
J. W. McCaughey

Witnesses

By Victor J. Evans
Attorney

UNITED STATES PATENT OFFICE.

JOHN W. McCAUGHEY, OF MONTGOMERY, ALABAMA.

MIXING AND PACKING APPARATUS FOR MOLASSES FEED.

1,267,241.　　　　　Specification of Letters Patent.　　Patented May 21, 1918.

Application filed October 28, 1916.　Serial No. 128,262.

*To all whom it may concern:*

Be it known that I, JOHN W. MCCAUGHEY, a citizen of the United States, residing at Montgomery, in the county of Montgomery and State of Alabama, have invented new and useful Improvements in Mixing and Packing Apparatus for Molasses Feed, of which the following is a specification.

This invention relates to improvements in apparatus for mixing and packing molasses food stuff and has particular application to an automatic mixing and packing machine.

In carrying out the present invention, it is my purpose to provide apparatus of the class described whereby the dry food stuff and the molasses syrup may be thoroughly and effectively mixed and then delivered to packing tubes that are in open communication with sacks to receive the food stuff and wherein the mixture delivered to the tubes will be compressed into the sacks in order that the latter may be filled properly.

It is also my purpose to provide apparatus of the type set forth wherein the mixing chamber and the packing tubes will be so arranged and correlated as to prevent loss of the food stuff when being transferred from the mixing chamber to the tubes and eliminate choking of the chutes leading from the mixing chamber to the tubes.

Another object of my invention is the provision of a mixing and packing machine which will be entirely automatic in operation and which will embody comparatively few parts and these so arranged and correlated as to reduce the possibility of derangement to a minimum.

With the above and other objects in view, the invention consists in the construction, combination and arrangement of parts hereinafter set forth in and falling within the scope of the claims.

Figure 1:
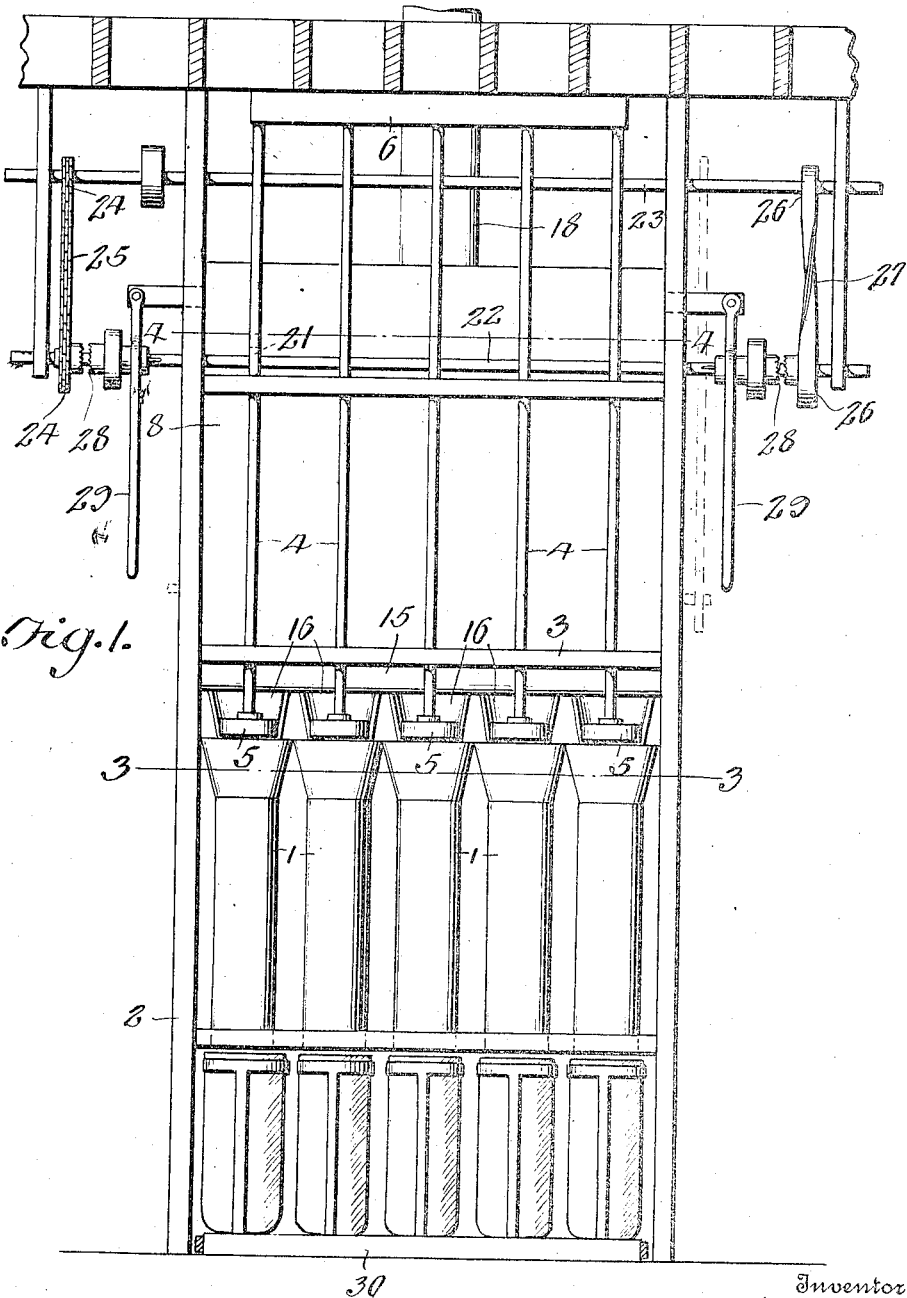
Figure 1 is a view in front elevation of a mixing and packing machine constructed in accordance with the present invention.
Figure 2:
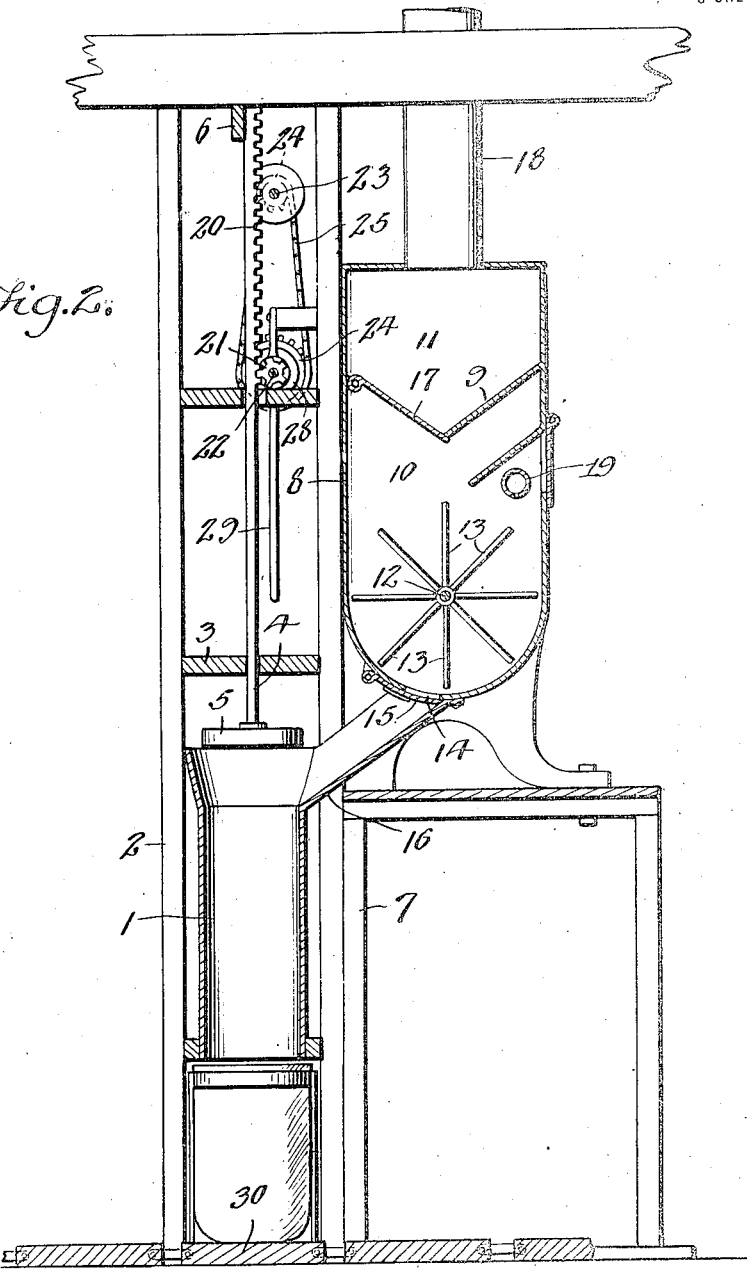
Fig. 2 is a vertical cross sectional view therethrough.
Figure 3:
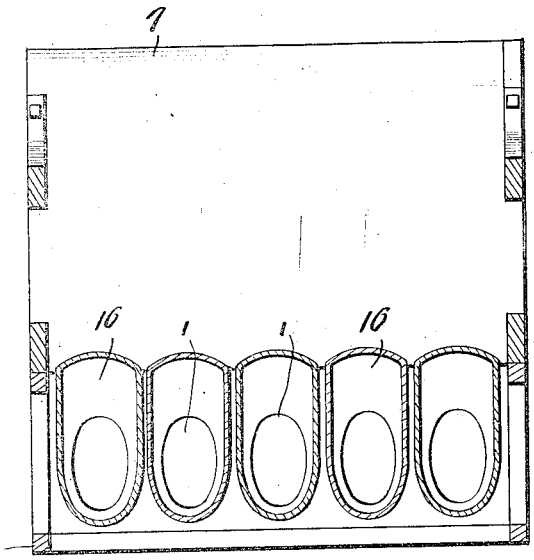
Fig. 3 is a horizontal sectional view on the line 3—3 of Fig. 1.
Figure 4:
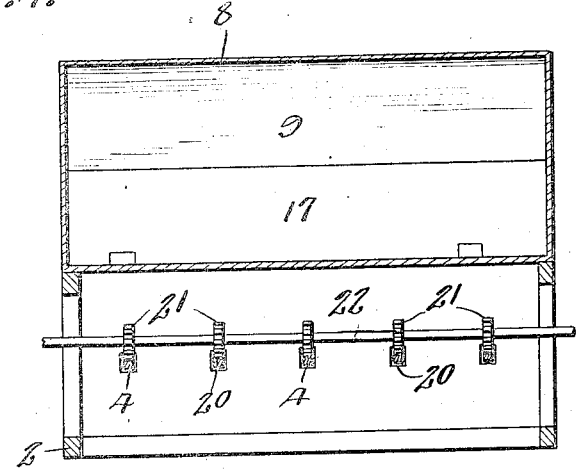
Fig. 4 is a similar view on the line 4—4 of Fig. 1.

Referring now to the drawings in detail, 1 designates a plurality of vertical packing tubes arranged side by side and supported by suitable framework 2. Extending across the frame 2 is a cross bar 3 arranged a suitable distance above the tubes 1 and slidably mounted in the bar 3 and disposed in axial alinement with the respective tubes are plunger rods 4 and mounted upon the lower ends of the plunger rods 4 are plungers 5 capable of movement into and out of the tubes 1 respectively. The upper extremities of the plunger rods 4 are connected to one another by means of a transverse connecting bar 6. Arranged at one side of the frame 2 and of a height less than that of the frame 2 is an auxiliary supporting frame 7 having the upper end thereof terminating in line with the upper ends of the tubes 1. Mounted upon the frame 7 is a casing 8 of a length equal to that of the frame 2 and having the lower end rounded in cross section as clearly illustrated in Fig. 2 of the drawings. The upper portion of the casing 8 is separated from the lower portion thereof by means of a partition 9 substantially V-shaped in cross section and acting to divide the casing into a lower mixing chamber 10 and a food stuff mixing chamber 11 disposed above the mixing chamber 10. Rotatably mounted in the mixing chamber 10 and preferably disposed at the center of the arc upon which the curved bottom is struck is a shaft 12. Fixed to the shaft 12 and radiating therefrom are mixing arms 13 rotatable with the shaft 12. The bottom of the mixing chamber is formed with openings 14 corresponding to the tubes 1 respectively and closing these openings are sliding doors 15 capable of movement to open and closed position, while leading from the openings 14 to the respective tubes 1 are chutes 16 whereby the mixed material in the mixing chamber may be delivered to the packing tubes, the chutes 16 being inclined from the mixing chamber to the tubes in order to facilitate the delivery of the food stuff to the tubes. The partition 9 is provided with a swinging door 17 whereby the dry food stuff in the chamber 11 may be delivered to the mixing chamber, while leading into the upper end of the chamber 11 is a delivery spout 18 through which the dry food stuff be conveyed to the chamber 11. Extending through one end wall of the mixing chamber 10 is a syrup tube 19 by means of which the molasses syrup may be delivered to the mixing chamber when the door 17 is swung to open position to deliver a dry charge to the chamber 10. When the dry charge and the molasses are delivered to the mixing chamber and the shaft 12 and mixing blades 13 revolved, the dry charge and molasses are thoroughly mixed.

The plunger rods 4 are equipped with vertical rack bars 20 respectively and meshing with these rack bars are pinions 21 fixed upon a countershaft 22 journaled in suitable horizontally alining bearings. Arranged above the countershaft 22 is a line shaft 23 rotatably mounted in horizontally alining bearings and keyed upon the shafts 22 and 23 are sprocket wheels 24 respectively over which is trained an endless chain 25 whereby motion may be transmitted from the line shaft to the countershaft. Also mounted upon the line shaft and the countershaft are belt pulleys 26 over which is trained an endless crossed belt 27 whereby motion may be transmitted from the line shaft to the countershaft to revolve the latter in the reverse direction. The sprocket wheels and pulleys on the countershaft are loosely mounted thereon and associated with the same are clutches 28 respectively splined upon the countershaft and movable independently of each other into engagement with the sprocket wheels and pulleys so that the countershaft may be rotated in reverse directions. Each clutch is under the control of a lever 29. Shafts 12 may be driven in any suitable manner.

Arranged below the tubes 1 is a traveling table 30 adapted to carry the sacks to be filled and to bring such sacks into alinement with the respective packing tubes and this table may be provided with suitable bag holding devices so that the bags or sacks will be held in line with the packing tubes.

In practice, the dry charge and the syrup are delivered to the mixing chamber and the mixing arms revolved to thoroughly and effectively mix the molasses and the dry food stuff. After the parts have been properly mixed, the doors 15 are moved to open position so that the mixture may flow down the delivery chutes 16 into the tubes 1 and after the tubes have been filled, the doors 15 are moved to closed position, thereby cutting off communication between the mixing chamber and the tubes. The countershaft 22 is now connected to the line shaft 23 through the medium of the chain 25 and associated clutch mechanism and when this connection is effected, the plungers 5 move downwardly and force the food stuff through the packing tubes 1 into the sacks in communication with such tubes. After the sacks have been filled the countershaft is disconnected from the chain 25 and connected with the belt 27 through the medium of the particular clutch 28, thereby rotating the countershaft in the reverse direction and elevating the plungers so that the next charge may be delivered to the tubes. After the filling of the bags, the latter are carried away by the table and empty bags brought into communication with the tubes.

I claim:

1. In a machine of the class described, a plurality of vertical tubes arranged side by side, plungers above said tubes respectively and movable into and out of the same, a mixing chamber at one side of said tubes above the latter, means for temporarily supporting a charge of dry material in the upper portion of the chamber and comprising a stationary member projecting from one wall of the chamber, and a movable member coöperating with the stationary member and connected with another wall of the chamber, means for feeding syrup and dry food stuff to said chamber, chutes leading from said chamber to said tubes respectively whereby the mixture may be delivered to the tubes, the walls of the chutes extending around the upper walls of the tubes, means controlling communication between said chamber and chutes, means for lowering and elevating said plungers, and a traveling bag carrying table below said tubes whereby the empty bags may be brought into communication with the tubes and the filled bags carried away.

2. In a machine of the class described, a plurality of vertical tubes arranged side by side, plungers above said tubes respectively and movable into and out of the same, a mixing chamber at one side of said tubes above the latter, means for feeding syrup and dry food stuff to said chamber, chutes leading from said chamber to said tubes respectively, the walls of the chutes extending around the upper walls of the tubes and being outwardly flared, and rack and pinion mechanism for elevating and lowering said plungers.

3. In a machine of the class described, a plurality of vertical tubes arranged side by side, plungers above said tubes respectively and movable into and out of the same, a mixing chamber at one side of said tubes above the latter, means for temporarily supporting a charge of dry material in the upper portion of the chamber and comprising a shelf member projecting downwardly from one wall of the chamber and a pivotally mounted member projecting downwardly at a corresponding angle and engaging the free end of the shelf member, means for feeding syrup and dry food stuff to said chamber, chutes leading from said chamber to said tubes respectively, a countershaft, rack and pinion connections between said countershaft and plungers, a line shaft, connections between said line shaft and countershaft whereby the latter may be rotated in one direction to lower the plungers, and connections between said line shaft and countershaft whereby said countershaft may be rotated in the reverse direction to elevate the plungers.

In testimony whereof I affix my signature.

JOHN W. McCAUGHEY.